J. C. WELLS.
SPECTACLES AND EYEGLASSES.
APPLICATION FILED FEB. 21, 1911.
1,090,181.
Patented Mar. 17, 1914.
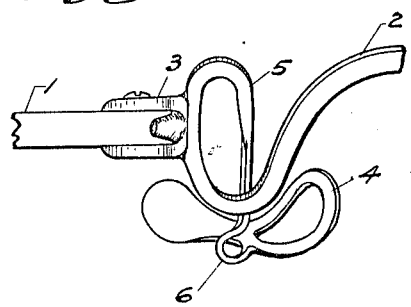
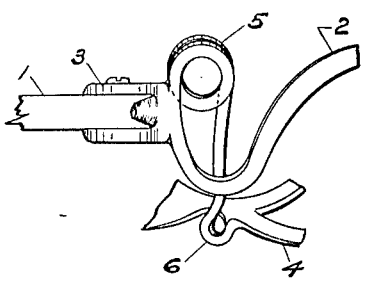
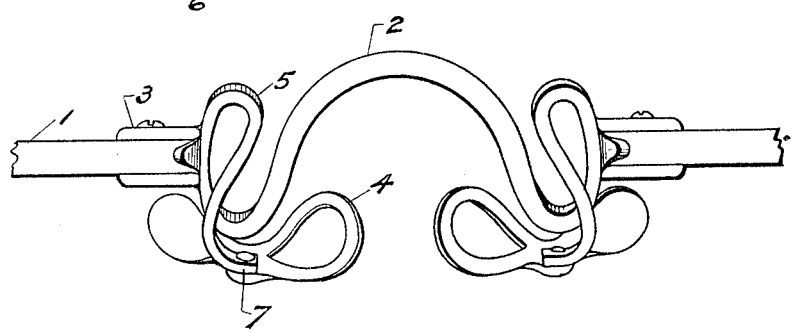
WITNESSES:
R. H. Waters.
Reginald R. Miller.
INVENTOR
JOEL C. WELLS
BY
Harry H. Styll
ATTORNEY

UNITED STATES PATENT OFFICE.

JOEL C. WELLS, OF SOUTHBRIDGE, MASSACHUSETTS.

SPECTACLES AND EYEGLASSES.

1,090,181. Specification of Letters Patent. Patented Mar. 17, 1914.

Application filed February 21, 1911. Serial No. 609,867.

*To all whom it may concern:*

Be it known that I, JOEL C. WELLS, a citizen of the United States, residing at Southbridge, in the county of Worcester and State of Massachusetts, have invented certain new and useful Improvements in Spectacles and Eyeglasses, of which the following is a specification.

My invention relates to improvements in eyeglasses and spectacles and has for its object to provide an improved construction of nose clamp or guard, particularly intended for use in connection with spectacles but applicable also to eyeglasses.
My invention comprises a pair of lenses connected by a bridge, a nose clamp or guard and an attaching arm extending from the lens connecting means to the guard, said attaching arm being so disposed that the guard may be pliably adjusted in both the horizontal and vertical planes.

The principal object of my invention is to provide means whereby a large latitude of adjustment of the nose clamp or guard is permitted in adapting them to the various requirements of the wearer's nose.

Another object of my invention is to provide attaching means for the nose clamps or guards which are more or less resilient or yielding whereby they will easily and comfortably adapt themselves to the nose.

Another important object of my invention is to provide attaching means for the nose clamps or guards, whereby the outer edge of the guard is left free and may be adjusted or turned in to engage the flesh of the nose and prevent easy displacement therefrom.

With these and other objects in view, the invention consists in the novel construction and arrangement of parts hereinafter described, delineated in the drawings and specifically claimed, it being understood that changes properly falling within the scope of what is claimed may be made without departing from the spirit of my invention.

Similar numerals of reference are employed to denote corresponding parts throughout the several figures of the drawings.
In the accompanying drawings: Figure I represents a fragmentary view of a mounting illustrating one form of my invention. Fig. II represents a plan view illustrating a slightly different arrangement of the parts with the guard shown as separate from in place of integral with the arm, and Fig. III represents a fragmentary view of another slight modification of my invention.

Referring specifically to the drawings, a pair of lenses 1 are connected in the usual manner by a bridge 2 and lens clips or straps 3. A nose guard 4 is supported in its alinement with the nose by a pliable attaching arm 5 which is secured to the lens attaching means 3. This attaching arm 5 may be made an independent arm secured to the lens clips 3 or it may be made a continuation of the bridge 2, said continuation being bent back, as shown, to attach to the guard 4. In Fig. I the attaching arm is shown as first projecting forwardly from the lens clip 3 to a turn and thence rearwardly to the nose guard, the loop or fold 6 being interposed between the arm and the guard. In Fig. II the attaching arm 5 is shown as projecting first forwardly and then rearwardly, as in Fig. I, but the guard 4 is attached to the arm 5 by means of a pivot bearing 7 instead of integrally as shown in Figs. I and III. In Fig. II the arm 5 is also shown bent in toward the adjacent lens, illustrating that the arm may be adjusted to vary the positions of the guard in the horizontal plane.

The adjustability and resiliency of the arm 5 are facilitated and increased in scope by the loops or folds in the arm. These loops may be open folds or bends as shown in Figs. I and II or they may be made with coils as shown in Fig. III. These coils may be inserted between the arm and its attachment to the lens attaching means or between the arm and the guard connection and will increase both the adjustability and resiliency of the arm.

The arm 5 is made of such dimensions and material as to be pliable so that it may be displaced either vertically or horizontally as desired, by bending. The guard 4 may also be adjusted with respect to the arm 5 by means of a torsional twist, throwing one end of the guard up or down, or in or out, as desired. The nose clamps or guards may be secured either integrally to the arm 5 or pivoted thereto, as desired, and according to the tastes of the wearer, and may be adjusted to the nose as follows:

The distance between the nose guards 4 to accommodate the width of the wearer's nose is regulated and adjusted by bending the arm 5 in the horizontal plane, the adjustment being facilitated by the loops or goose neck folds therein, as illustrated in Fig. II, which carries back the nose guards in a plane substantially parallel with the plane of the lenses, thus widening or decreasing the distance between the guards in accordance with the direction in which the arm 5 is bent, it being noted in this connection that greater adjustment may be obtained where the arm 5 first projects from the lens clips in a forwardly direction and then bends back rearwardly to the nose guards, as shown in Figs. I and II. The front or free edge of the guard may be bent or turned in to grasp the nose so as to raise a mound or fold of flesh in front of it to retard displacement by twisting backward or forward, as desired, the loop 6 interposed between the arm 5 and the guard 4. The free edge may also be drawn out by pulling out the guard so as to widen the distance between the edge of the guard and the arm 5. The guard 4 may also be adjusted to the nose in a vertical direction by giving the arm 5 a torsional twist so as to allow the lower edge of the guard to be brought in or out as desired, the angularity of the guard being determined by the amount of twisting given the arm 5. If a pivoted guard is used, as shown in Fig. II, the guard may adjust itself to the nose in a vertical direction by means of the movement about the pivot 7. The arm 5 may also be formed so that the pressure on the nose will be more or less yielding and resilient, the arm 5 acting in the nature of a spring arm or member. This condition in view of the other conditions described above, however, is not essential and need not be adopted unless so desired.

I am aware that previous to my invention nose guards connecting the bridge of spectacles with the lens attaching means have been used wherein the scope of adjustment has been more or less limited, but I am not aware that such connections have been made wherein universal adjustments can be made to accommodate the guards to the requirements of the wearer under the various conditions referred to above and it is, therefore, the object of my invention to improve such connections so that they will be more universally applicable to the requirements of the art.

It will be seen that by the use of the flexible attaching arm 5 with its various loops, the distance between the guards can be varied to considerable extent. The guard may be bent in or out, toward or away from the face; the free edge of the guard may be bent in to engage the nose and raise a mound or fold of flesh in front of it to retard displacement; the guard may be adjusted to the slope or angle of the nose and a yielding pressure may be obtained on the nose,—advantages hitherto not obtained.

From the nature of my invention it will be noted that various methods of bending or folding the arm 5 may be devised without departing from the spirit of my invention. I, therefore, do not desire to be limited to the exact details shown and described.

Having thus described my invention, the following is what I claim as new therein and desire to secure by Letters Patent:

In eyeglasses and spectacles, lenses, connected lens holding means, nose guards, supports uniting the lens holding means and the guards, a forwardly extending loop between the supports and the lens holding means, and a rearwardly extending loop between the supports and the nose guards.

In testimony whereof I affix my signature in presence of two witnesses.

JOEL C. WELLS.

Witnesses:
PITT H. HERBERT,
CHARLES I. KING.

Copies of this patent may be obtained for five cents each, by addressing the "Commissioner of Patents, Washington, D. C."